UNITED STATES PATENT OFFICE.

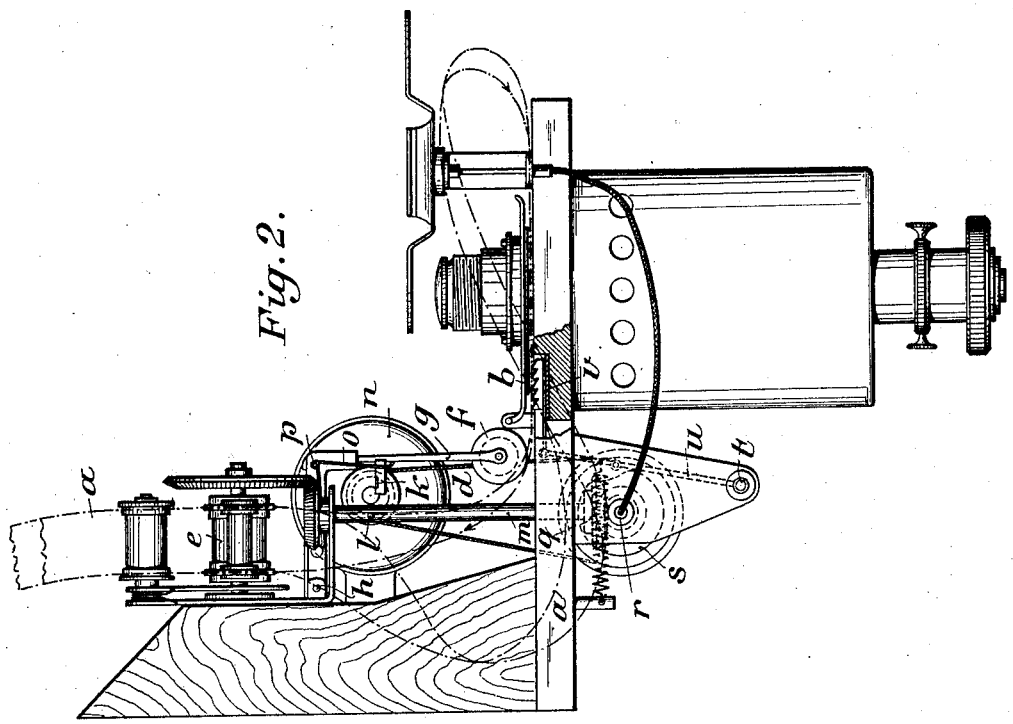
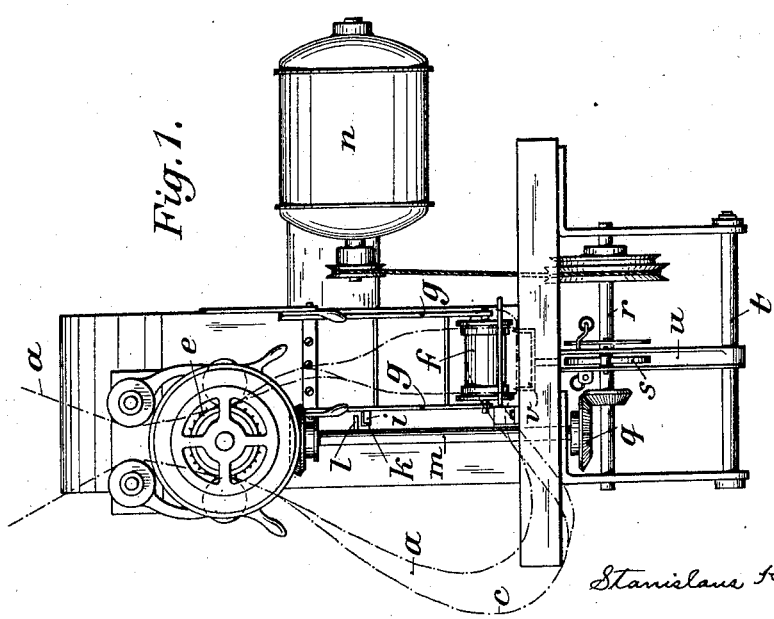

STANISLAUS KUCHARSKI, OF CHARLOTTENBURG, NEAR BERLIN, GERMANY, ASSIGNOR TO RICHARD A. HANSEMANN, OF BERLIN, GERMANY.

DEVICE FOR MAINTAINING THE SLACK OF CINEMATOGRAPHIC FILMS.

1,395,119.  Specification of Letters Patent.  Patented Oct. 25, 1921.

Application filed November 28, 1919. Serial No. 341,207.

*To all whom it may concern:*

Be it known that I, STANISLAUS KUCHARSKI, engineer, a citizen of Germany, residing at and whose post-office address is Charlottenburg, near Berlin, Dernburgstrasse 45, Germany, have invented certain new and useful Improvements in Devices for Maintaining the Slack of Cinematographic Films, of which the following is a specification.

This invention relates to a device for maintaining the correct amount of slack in cinematographic films near the focal plane of the lens of automatically operating apparatus for displaying moving pictures.

In automatic cinematographs in which a slack portion of film band is maintained behind the window through which the moving pictures are projected, it may happen that the slack becomes so short as to prevent the injured film band from being pulled on step-by-step in the proper manner. The object of the invention is to provide a device for preventing an impermissible shortening of the slack. In accordance with the invention the device is arranged to automatically pull forward a certain amount of film to make up for any said shortness of slack, and to thus constantly maintain the slack at the proper length. The device by which this is accomplished consists of a member which, on the slack being unduly shortened, is automatically brought by the partially tautened film into engagement with a moving part and caused to exert a pull upon the film band so as to draw forward the length required to make up the correct amount of slack.

A manner of carrying out the invention is shown in the drawing in which—

Figure 1 shows a view of the slack regulating device and

Fig. 2 is a side view as seen from the left of Fig. 1.

The film band $a$ is drawn forward so as to provide a store of slack $c$ before the window $b$ and another piece of slack $d$ behind this window, the latter piece being continually kept at a certain length by the motion imparted to it by the roll $e$. A means is provided for restoring this piece of slack to the required length in case it is unduly shortened, this means consisting of a roll $f$ arranged within the reach of the slack $d$ and journaled in an arm $g$ which is pivoted to the frame at the point $h$. The arm $g$ is provided with a projection or dog $i$ with an angle piece $k$. The dog $i$ usually lies beneath the path traversed by a pin $l$, which is attached to the shaft $m$. The shaft $m$ is an intermediate shaft which serves to transmit the motion of the motor $n$ to the roll $e$ which performs the double function of pulling one part of the film band away from, and feeding another part of it toward, the window of the apparatus. The shaft $r$ is driven from motor $n$ and by means of a cam-disk $s$, causes oscillations of a lever $u$ that is pivoted at $t$ and that imparts its oscillations to a seizing member $v$ which shifts the picture band step-by-step past the picture window.

As long as the slack $d$ of the film is sufficiently long the arm $g$ remains in the position shown in the drawing and in which the pin $l$ attached to the rotating shaft $m$ passes over the dog $i$ as indicated in Fig. 1. But if the allowance of slack $d$ becomes too short it will lift the lever $g$ to such an extent that the pin $l$ rotated by the shaft $m$ will seize the dog $i$ beneath the angle $k$, thus swinging forward the arm $g$, which has an articulation at some point between its two ends, say at P, where its two hinged portions are normally forced apart by a spring $o$ so as to form a certain angle. The roll $f$ is thus caused to exert a pull upon the slack portion $d$ of the film and to cause the normal length of slack to be restored and to maintain the pictures at the window in their correct positions. The upper side of the angle piece $k$ lays itself upon the pin $l$ so as to prevent a premature dropping of the arm $g$ and enable sufficient film to be pulled forward to restore the slack to its full length before the pin $l$ releases the arm $g$ with the roll $f$.

I claim:

1. In combination with a self-acting apparatus for displaying moving pictures, a film band, a window, means for moving one portion of the film band toward, and another portion away from the said window, while providing a certain amount of entering slack before, and a certain amount of issuing slack beyond, the window, a driving member, and a slack-lengthening member shifted by the issuing slack into engagement with the driving member when the length of the issuing slack is unduly shortened.

2. In combination with a self-acting apparatus for displaying moving pictures, a film band, a window, means for moving one portion of the film band toward, and another portion away from the said window, while providing a certain amount of entering slack before, and a certain amount of issuing slack beyond the window, a source of power, a shaft rotated by the said power, and a pin carried by said shaft, a frame, a slacklengthening member comprising an arm arranged to press against the issuing slack, and a dog attached to the said arm, and movable joints allowing the dog of the slacklengthening member to be lifted by the issuing slack into the range of the rotating pin and permitting the slacklengthening member to press against, and exert a pull upon, the issuing slack.

3. In combination with a self-acting apparatus for displaying moving pictures, a film band, a window, means for moving one portion of the film band toward, and another portion away from, the said window, while providing a certain amount of entering slack before, and a certain amount of issuing slack beyond, the window, a source of power, a shaft rotated by the said power, and a pin carried by said shaft, a frame, a slacklengthening member comprising an arm arranged to press against the issuing slack and a dog attached to the said arm, movable joints allowing the dog of the slacklengthening member to be lifted by the issuing slack into the range of the rotating pin and permitting the slacklengthening member to press against, and exert a pull upon, the issuing slack, and a means attached to the said dog for maintaining said slacklengthening member in a lifted position until a sufficient lengthening of the issuing slack has been accomplished.

In testimony whereof I have affixed my signature in presence of two witnesses.

STANISLAUS KUCHARSKI.

Witnesses:
PAUL MASCOW,
PAUL GALDA.